US008999589B2

United States Patent
Takahashi

(10) Patent No.: US 8,999,589 B2
(45) Date of Patent: Apr. 7, 2015

(54) NONAQUEOUS SECONDARY BATTERY

(75) Inventor: Kentaro Takahashi, Sumoto (JP)

(73) Assignee: SANYO Electric Co., Ltd., Daito-shi (JP)

( * ) Notice: Subject to any disclaimer, the term of this patent is extended or adjusted under 35 U.S.C. 154(b) by 937 days.

(21) Appl. No.: 12/966,041

(22) Filed: Dec. 13, 2010

(65) Prior Publication Data

US 2011/0183217 A1 Jul. 28, 2011

(30) Foreign Application Priority Data

Jan. 27, 2010 (JP) ................................. 2010-015513

(51) Int. Cl.
H01M 10/056 (2010.01)
H01M 4/131 (2010.01)
H01M 4/525 (2010.01)
H01M 4/62 (2006.01)
H01M 10/052 (2010.01)
H01M 10/0567 (2010.01)
H01M 10/42 (2006.01)
H01M 4/505 (2010.01)

(52) U.S. Cl.
CPC .............. *H01M 4/131* (2013.01); *H01M 4/525* (2013.01); *H01M 4/621* (2013.01); *H01M 10/052* (2013.01); *H01M 10/0567* (2013.01); *H01M 10/4235* (2013.01); *H01M 4/505* (2013.01); *H01M 2300/0025* (2013.01); *Y02E 60/122* (2013.01); *Y02T 10/7011* (2013.01)

(58) Field of Classification Search
USPC ................. 429/209–246, 188, 189, 301–347, 429/199–207
See application file for complete search history.

(56) References Cited

U.S. PATENT DOCUMENTS 3,905,936 A * 9/1975 Hawthorne .................... 523/202
6,706,443 B1 * 3/2004 Krampitz et al. ............. 429/224
7,268,238 B2 * 9/2007 Woo et al. ..................... 549/296
7,867,654 B2 * 1/2011 Fujihara et al. ............... 429/212
2005/0214556 A1 * 9/2005 Nishimi et al. ................ 428/500
2007/0224340 A1 * 9/2007 Hatta et al. .................... 427/160
2007/0231700 A1 * 10/2007 Watanabe ..................... 429/246
2008/0233477 A1 * 9/2008 Takahashi et al. ............. 429/212

FOREIGN PATENT DOCUMENTS

| JP | 9-199112 A | | 7/1997 | |
|---|---|---|---|---|
| JP | 2002-319405 A | | 10/2002 | |
| JP | 2004-265680 | * | 2/2003 | ............ Y02E 60/122 |
| JP | 2007-242303 A | | 9/2007 | |
| JP | 2007-280830 A | | 10/2007 | |
| JP | 2008-123714 A | | 5/2008 | |
| JP | 2010-192165 | * | 9/2010 | ............ Y02E 60/122 |

OTHER PUBLICATIONS

Machine translation of JP 2004-265680 by Asaoki.*
Machine translation of JP 2010-192165 by Takahashi.*
Machine English Translation of JP 2002-319405 to Nishide.*

* cited by examiner

*Primary Examiner* — Nicholas P D'Aniello
*Assistant Examiner* — Michael Dignan
(74) *Attorney, Agent, or Firm* — Westerman, Hattori, Daniels & Adrian, LLP

(57) ABSTRACT

A positive electrode active material has an average particle diameter of 4.5 to 15.5 μm and a specific surface area of 0.13 to 0.80 m²/g. A positive electrode mixture layer contains a silane coupling agent and/or at least one of aluminum, titanium, or zirconium based coupling agent having an alkyl or alkoxy groups having 1 to 18 carbon atoms at a content of 0.003% by mass or more and 5% by mass or less with respect to the mass of the positive electrode active material. The nonaqueous electrolyte contains a fluorinated cyclic carbonate esters at a content of 0.3% by mass or more with respect to the total mass of the nonaqueous electrolyte. Thus the nonaqueous secondary battery in which, when used with a nonaqueous electrolyte containing a fluorinated cyclic carbonate esters, cycle characteristics are good and nail penetration characteristics are superior is provided.

8 Claims, No Drawings

NONAQUEOUS SECONDARY BATTERY

TECHNICAL FIELD

The present invention relates to a nonaqueous secondary battery including a lithium composite oxide as a positive electrode active material and using a nonaqueous electrolyte containing a fluorinated cyclic carbonate esters. More particularly, the invention relates to a nonaqueous secondary battery including a lithium composite oxide as a positive electrode active material in which, and when used with a nonaqueous electrolyte containing a fluorinated cyclic carbonate esters, nail penetration characteristics are improved and superior cycle characteristics are obtained.

BACKGROUND ART

Recently, as power supplies for driving portable electronic equipment, such as cell phones, portable personal computers, and portable music players, and further, as power supplies for hybrid electric vehicles (HEVs) and electric vehicles (EVs), nonaqueous secondary batteries represented by lithium ion secondary batteries having a high energy density and high capacity are widely used.

As for the positive electrode active material in these non-aqueous secondary batteries, one of or a mixture of a plurality of lithium transition-metal composite oxides represented by $LiMO_2$ (where M is at least one of Co, Ni, and Mn), (namely, $LiCoO_2$, $LiNiO_2$, $LiNi_yCo_{1-y}O_2$ (y=0.01 to 0.99), $LiMnO_2$, $LiMn_2O_4$, $LiCo_xMn_yNi_zO_2$ (x+y+z=1)), phosphoric acid compounds having an olivine structure such as $LiFePO_4$, and the like, all of which can reversibly absorb and desorb lithium ions, is used.

Carbonaceous materials such as graphite and amorphous carbon are widely used as the negative electrode active material in nonaqueous secondary batteries. The reason is that carbonaceous materials have discharge potential equal to that of a metal lithium or a lithium alloy but do not cause dendrite growth, and thus, carbonaceous materials have superior characteristics of high safety, superior initial efficiency, good potential flatness, and high density.

As a nonaqueous solvent for a nonaqueous electrolyte, carbonate esters which are also referred to as carbonates, lactones, ethers, esters, and the like are used alone or in mixtures of two or more. Among them, carbonate esters are widely used because they have an especially high dielectric constant and provide larger ion conductivity to the nonaqueous electrolyte. Among carbonate esters, it is known that, when both a fluorinated cyclic carbonate esters and a uorinated chain carbonate esters are contained, cycle characteristics are improved because decomposition of the nonaqueous electrolyte is suppressed and the nonaqueous electrolyte is electrochemically stabilized (see JP-A-2008-123714).

JP-A-09-199112 discloses an example in which a positive electrode mixture is mixed with an aluminum coupling agent in order to improve cycle characteristics when a nonaqueous secondary battery is charged and discharged at high voltage under heavy load. Furthermore, JP-A-2002-319405 discloses an example in which a silane coupling agent having an organic reactive group such as an epoxy group and amino group and a bonding group such as a methoxy group and ethoxy group is dispersed in a positive electrode mixture in order to improve wettability of a positive electrode with an electrolyte in a nonaqueous secondary battery at low temperature and to improve output characteristics at low temperature. JP-A-2007-242303 discloses an example in which a positive electrode active material is treated with a silane coupling agent having a plurality of bonding groups in order to improve cycle characteristics when intermittent cycles of a nonaqueous secondary battery are repeated. JP-A-2007-280830 discloses an example in which a silane coupling agent is present near a broken surface of a positive electrode active material occurring when a positive electrode mixture layer is compressed in order to improve cycle characteristics of a nonaqueous secondary battery.

In the invention disclosed in JP-A-2008-123714, it is clear that cycle characteristics are improved because a nonaqueous electrolyte includes both a fluorinated cyclic carbonate esters and a uorinated chain carbonate esters. However, when the nonaqueous electrolyte includes at least a fluorinated cyclic carbonate esters as a nonaqueous solvent, nail penetration characteristics decrease. The nail penetration characteristics show the degree of smoking or burning when a nail penetrates a battery. In the nail penetration characteristics test, a forced internal short circuit is caused inside a battery, and thus, the temperature becomes abnormally high locally inside the battery. Therefore, nail penetration characteristics are one indicator that shows the degree of battery thermal runaway.

It is believed that such characteristics of a fluorinated cyclic carbonate esters are caused by the following reasons. That is, it is hard for the fluorinated cyclic carbonate esters to form a stable surface film on a positive electrode surface because of its strong oxidation resistance. Thus, in a nonaqueous secondary battery including a nonaqueous electrolyte with the fluorinated cyclic carbonate esters added, the nonaqueous electrolyte is readily oxidatively decomposed on the positive electrode surface, and thus, thermal runaway is readily caused in an abnormally heated environment, for example, by nail penetration. In contrast, a stable surface film is formed on a negative electrode, and thus, cycle characteristics are improved.

The inventions disclosed in JP-A-09-199112, JP-A-2002-319405, JP-A-2007-242303, and JP-A-2007-280830 show that mixing a silane or aluminum coupling agent in a positive electrode mixture can possibly lead to an improvement in cycle characteristics and output characteristics in a low temperature environment to some extent. However, JP-A-09-199112, JP-A-2002-319405, JP-A-2007-242303, and JP-A-2007-280830 provide no description on nail penetration characteristics while a silane or aluminum coupling agent is mixed in a positive electrode mixture.

The inventors of the present invention have carried out various studies in order to ensure nail penetration safety with a nonaqueous electrolyte containing at least the fluorinated cyclic carbonate esters as a nonaqueous solvent. As a result, the inventors have found that the problems mentioned above can be solved when a positive electrode mixture contains a predetermined amount of a silane or aluminum coupling agent and the average particle diameter and the specific surface area of a positive electrode active material including a lithium composite oxide are maintained in a predetermined range, whereby the invention has been accomplished.

SUMMARY

An advantage of some aspects of the invention is to provide a nonaqueous secondary battery including a lithium composite oxide as a positive electrode active material and using a nonaqueous electrolyte containing a fluorinated cyclic carbonate esters, that has improved nail penetration characteristics and superior cycle characteristics.

According to an aspect of the invention, a nonaqueous secondary battery of the invention includes a positive electrode plate with a positive electrode mixture layer formed having a lithium composite oxide as a positive electrode active material, a negative electrode plate, a separator, and a nonaqueous electrolyte. In the nonaqueous secondary battery, the positive electrode active material has an average particle diameter of 4.5 to 15.5 μm and a specific surface area of 0.13 to 0.80 m²/g, the positive electrode mixture layer contains at least one of a silane coupling agent and a coupling agent represented by General Formula (I) at a content of 0.003% by mass or more and 5% by mass or less with respect to the mass of the positive electrode active material, and the nonaqueous electrolyte contains a fluorinated cyclic carbonate esters represented by General Formula (II) at a content of 0.3% by mass or more with respect to the total mass of the nonaqueous electrolyte:

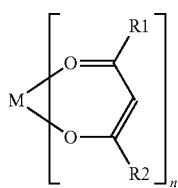

(where M is one atom selected from Al, Ti, and Zr, each of R1 and R2 is an alkyl group or an alkoxy group having 1 to 18 carbon atoms, and n represents an integer of 1 to 4),

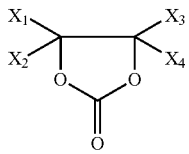

(where each of X1 to X4 is a fluorine group, an alkyl group, or a fluorinated alkyl group, X1 to X4 are optionally the same as or different from each other, at least one of which is a fluorine group or a fluorinated alkyl group).

In the nonaqueous secondary battery of the invention, a fluorinated cyclic carbonate esters represented by General Formula (II) is contained at a content of 0.3% by mass or more with respect to the total mass of the nonaqueous electrolyte. When such composition is adopted, the decomposition of the nonaqueous electrolyte is suppressed, the nonaqueous electrolyte is electrochemically stabilized, and thus, cycle characteristics are improved. When the content of the fluorinated cyclic carbonate esters in a nonaqueous electrolyte is less than 0.3% by mass with respect to the total mass of the nonaqueous electrolyte, the addition effect of the fluorinated cyclic carbonate esters cannot be obtained. The nail penetration characteristics can be maintained even when the added amount of the fluorinated cyclic carbonate esters is large, but cycle characteristics start to decline when the amount is excessively large. Thus, it is desirable that the amount added does not exceed 40.0% by mass.

Examples of the fluorinated cyclic carbonate esters include 2-fluoro-1,3-dioxolan-2-one (fluoroethylene carbonate: FEC), trans-4,5-difluoro-1,3-dioxolan-2-one (trans-difluoroethylene carbonate: trans-DFEC), and cis-4,5-difluoro-1,3-dioxolan-2-one (cis-difluoroethylene carbonate: cis-DFEC). Among these fluorinated cyclic carbonate esters, FEC is preferred.

In the nonaqueous secondary battery of the invention, the positive electrode mixture layer is required to contain a coupling agent including a silane coupling agent, a coupling agent represented by General Formula (I), or a silane coupling agent and a coupling agent represented by General Formula (I).

When the positive electrode mixture layer does not contain such a coupling agent or contains other coupling agents, both the nail penetration characteristics and the cycle characteristics decrease even if the other conditions of the invention are satisfied.

In the nonaqueous secondary battery of the invention, the positive electrode mixture layer is required to contain a coupling agent including at least one of a silane coupling agent and a coupling agent represented by General Formula (I) at a content of 0.003% by mass or more and 5% by mass or less with respect to the mass of the positive electrode active material. When the content of such a coupling agent is less than 0.003% by mass with respect to the mass of the positive electrode active material, the content is too low to provide the addition effect of the coupling agent even if the other conditions of the invention are satisfied. When the content of such a coupling agent is more than 5% by mass with respect to the mass of the positive electrode active material, the coupling agent does not affect electrode reactions and the added amount of the positive electrode active material is reduced accordingly, and furthermore, positive electrode resistance becomes large to reduce initial capacity even if the other conditions of the invention are satisfied.

Such an effect by mixing the coupling agent in a positive electrode mixture layer is supposed to be provided for the following reasons. It is supposed that a stable positive electrode surface film is formed by interaction of an oxidatively decomposed compound produced by the coupling agent and the fluorinated carbonate esters, the decomposition of the nonaqueous electrolyte is suppressed on the positive electrode surface, and the positive electrode obtains improved thermal stability to contribute to the improvement of nail penetration characteristics. The added amount of the coupling agent is more preferably 0.01% by mass or more and 1.0% by mass or less, and most preferably 0.1% by mass or more and 0.5% by mass or less.

In the nonaqueous secondary battery of the invention, the positive electrode active material is required to have an average particle diameter of 4.5 to 15.5 μm and a specific surface area of 0.13 to 0.80 m²/g. When the positive electrode active material has an average particle diameter of less than 4.5 μm, even when the conditions of the invention other than this are satisfied, both the cycle characteristics and the nail penetration characteristics decrease. The nail penetration characteristics are good but the cycle characteristics start to decline when the positive electrode active material has an average particle diameter of more than 15.5 μm even if the other conditions of the invention are satisfied.

In the nonaqueous secondary battery of the invention, the nail penetration characteristics are good but the cycle characteristics decrease when the positive electrode active material has a specific surface area of less than 0.13 m²/g even if the other conditions of the invention are satisfied. Both the nail penetration characteristics and the cycle characteristics decrease when the positive electrode active material has a specific surface area of more than 0.80 m²/g even if the other conditions of the invention are satisfied.

Such an effect by limiting the average particle diameter and the specific surface area of the positive electrode active material is supposed to be provided for the following reasons. When the positive electrode active material has an excessively small average particle diameter or an excessively large specific surface area, the short circuit current when a nail is penetrated becomes excessively large. Consequently, the formed positive electrode surface film is thermally decomposed to reduce the thermal stability. When the positive electrode active material has an excessively large average particle diameter or an excessively small specific surface area, the formed positive electrode surface film has increased resistance, and thus, the cycle characteristics decrease.

Preferred examples of the positive electrode active material used in the nonaqueous secondary battery of the invention include lithium composite oxides such as $LiCoO_2$, $LiNiO_2$, $LiMn_2O_4$, $LiMnO_2$, $LiNi_{1-x}Mn_xO_2$ ($0<x<1$), $LiNi_{1-x}Co_xO_2$ ($0<x<1$), and $LiNi_xMn_yCo_zO_2$ ($0<x, y, z,<1$, $x+y+z=1$).

Examples of the negative electrode active material usable in the nonaqueous secondary battery of the invention include carbon materials such as graphite, non-graphitizable carbon, and graphitizable carbon; titanium oxides such as $LiTiO_2$ and $TiO_2$; metalloid elements such as silicon and tin; and an Sn—Co alloy.

In the nonaqueous secondary battery of the invention, examples of other nonaqueous solvents usable as a mixture with a fluorinated cyclic carbonate esters represented by General Formula (II) include cyclic carbonate esters such as ethylene carbonate (EC), propylene carbonate (PC), and butylene carbonate (BC); cyclic carboxylic acid esters such as γ-butyrolactone (BL) and γ-valerolactone (VL); chain carbonate esters such as dimethyl carbonate (DMC), ethyl methyl carbonate (EMC), diethyl carbonate (DEC), methyl propyl carbonate (MPC), and dibutyl carbonate (DNBC); fluorinated chain carbonate esters; chain carboxylic acid esters such as methyl pivalate, ethyl pivalate, methyl isobutyrate, and methyl propionate; amide compounds such as N,N'-dimethylformamide and N-methyloxazolidinone; sulfur compounds such as sulfolane; and ambient temperature molten salts such as 1-ethyl-3-methylimidazolium tetrafluoroborate. These solvents are desirably used in mixtures of two or more. Among them, EC, PC, chain carbonate esters, fluorinated chain carbonate esters, and tertiary carboxylic acid esters are specifically preferred.

As a separator used in the nonaqueous secondary battery of the invention, microporous membrane separators formed from polyolefin materials such as polypropylene and polyethylene may be selected. The separator may be mixed with a resin having a low melting point in order to ensure the shutdown response of the separator, and may be laminated with a high-melting resin or be a resin supported with inorganic particles in order to obtain heat resistance.

The nonaqueous electrolyte used in the nonaqueous secondary battery of the invention may further include, as a compound for stabilizing electrodes, vinylene carbonate (VC), vinyl ethyl carbonate (VEC), succinic acid anhydride (SuAH), maleic acid anhydride (MaAH), glycolic acid anhydride, ethylene sulfite (ES), divinyl sulfone (VS), vinyl acetate (VA), vinyl pivalate (VP), catechol carbonate, biphenyl (BP), and the like. These compounds may be properly used in mixtures of two or more.

As an electrolyte salt dissolved in the nonaqueous solvent used in the nonaqueous secondary battery of the invention, lithium salts that are commonly used as an electrolyte salt in a nonaqueous secondary battery may be used. Examples of such a lithium salt include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures of them.

Among them, $LiPF_6$ (lithium hexafluorophosphate) is specifically preferred. The dissolution amount of an electrolyte salt is preferably 0.5 to 2.0 mol/L with respect to the nonaqueous solvent.

In the nonaqueous secondary battery of the invention, the nonaqueous electrolyte may be not only liquid but also gel.

As a silane coupling agent capable of being employed in the nonaqueous secondary battery of the invention, a silane coupling agent having at least one organic functional group and a plurality of bonding groups in the molecule may be used. The organic functional group may be any group having various hydrocarbon skeletons. Examples of the organic functional group include an alkyl group, a mercaptopropyl group, and a trifluoropropyl group. Examples of the bonding group include a hydrolyzable alkoxy group.

In a coupling agent having the structure of General Formula (I), M may be one atom selected from Al, Ti, and Zr, but Al is specifically preferred. When M is Al, the coupling agent can be synthesized at low cost, and better results can be obtained than when M is Ti or Zr.

In a coupling agent having the structure of General Formula (I), when at least one of R1 and R2 is an alkoxy group (such as an ethoxy group, an iso-propoxy group, and a tert-butoxy group), the coupling agent has a large effect on improving characteristics. It is preferable that an alkoxy group (such as an iso-propoxy group and a tert-butoxy group) be bonded to atom M in General Formula (I) because the reactivity to the positive electrode active material is improved. The number of alkoxy groups bonded to atom M is preferably two or less in order to improve the hydrolysis resistance of the compound.

A coupling agent may be contained in the positive electrode mixture layer in the nonaqueous secondary battery of the invention by direct coating on the positive electrode plate or mixing in a positive electrode mixture slurry. The coupling agent is not specifically limited and may be diluted in any solvent for use. Suitable examples of the solvent include organic solvents including ketones such as acetone and methyl ethyl ketone (MEK), ethers such as tetrahydrofuran (THF), alcohols such as ethanol and isopropanol, and N-methyl-2-pyrrolidone (NMP) and a silicone oil.

DESCRIPTION OF EXEMPLARY EMBODIMENTS

Exemplary embodiments of the invention will now be described in detail with reference to examples and comparative examples. It should be noted that the examples described below are illustrative examples of nonaqueous secondary batteries for embodying the technical spirit of the invention and are not intended to limit the invention to these examples, and the invention may be equally applied to various modifications without departing from the technical spirit described in the claims.

First, a specific method for producing a nonaqueous secondary battery common to various examples and comparative examples will be described.

Preparation of Positive Electrode

A positive electrode mixture was prepared by mixing 95% by mass of various positive electrode active materials, 2.5% by mass of amorphous carbon HS-100 (trade name) as a conductive material, and 2.5% by mass of polyvinylidene fluoride (PVdF). To the binder, 50% by mass of N-methylpyrrolidone (NMP) with respect to the mass of the positive electrode mixture was added to prepare a slurry. To the obtained slurry, a predetermined amount of various coupling agents was added. The whole was thoroughly stirred and then coated on both sides of an aluminum foil sheet with a thickness of 12 μm using the doctor blade method (coating amount: 400 g/m²). The coated foil was heated and dried (70 to 140° C.) to remove NMP and then formed under pressure so as to have a packing density of 3.70 g/cm³ (3.12 g/cm³ for $LiMn_2O_4$, for $LiMn_{1/3}Ni_{1/3}Co_{1/3}O_2$)). Then, the foil was cut into a predetermined size to give a positive electrode plate. Here, the average particle diameter and the specific surface area of the positive electrode active material were controlled by pulverization and classification operations with Mix Muller. The average particle diameter was measured with a laser diffraction particle size analyzer, and the specific surface area was measured by the BET specific surface area measuring method using nitrogen adsorption. Consequently, the average particle diameter and the specific surface area were ascertained to be within a predetermined range.

Preparation of Negative Electrode

A mixture was prepared by mixing 97% by mass of artificial graphite (d=0.335 nm), 2% by mass of carboxymethyl cellulose (CMC) as a thickener, and 1% by mass of styrene-butadiene rubber (SBR) as a binder. To the mixture, water was added to make a slurry. The slurry was coated on both sides of a copper foil having a thickness of 8 μm (coating amount: 210 g/m²). Then, the coated foil was dried to remove water, compressed with a compression roller until the packing density reached 1.6 g/cm³, and cut into a predetermined size to prepare a negative electrode plate.

Preparation of Battery before Pouring

A current collecting tab was welded to each of the positive electrode plate and the negative electrode plate each having a predetermined size. The electrode plates were wound with a polyethylene microporous membrane separator having a thickness of 16 μm interposed therebetween to prepare a wound electrode assembly. The obtained wound electrode assembly was stored into a laminated outer body that was formed into a cup shape. The outer body was sealed with heat except for a pouring hole to prepare a battery before pouring.

Preparation of Battery

A nonaqueous solvent was prepared by mixing 25% by mass of EC, 5% by mass of PC, 30% by mass of EMC, and 40% by mass of methyl pivalate. $LiPF_6$ as an electrolyte salt was dissolved in the nonaqueous solvent to prepare a nonaqueous electrolyte having a $LiPF_6$ concentration of 1 M. 14 ml of the nonaqueous electrolyte was poured through the pouring hole, and thereafter vacuum impregnation treatment was performed. The pouring hole was then sealed with heat, and charging and discharging were performed to complete a nonaqueous secondary battery having a design capacity of 2800 mAh (1 It=2800 mA). As for the cyclic carbonate, when the content of a fluorinated cyclic carbonate esters was 25% by mass or less, the corresponding mass of EC was replaced with a fluorinated cyclic carbonate esters to be added. When the content of a fluorinated cyclic carbonate esters was more than 25% by mass (Examples 9 and 10), the corresponding mass that was the sum of the total mass of EC and a certain mass of EMC were replaced with a fluorinated cyclic carbonate esters to be added.

Measurement of Battery Characteristics

On each battery of Examples and Comparative Examples prepared as above, initial capacity, cycle characteristics, and nail penetration characteristics were determined by the following measurement methods.

Measurement of Initial Capacity

Each battery of Examples and Comparative Examples was charged in a constant temperature bath at 23° C. at a constant current of 0.5 It=1400 mA until the battery voltage reached 4.2 V. After the battery voltage reached 4.2 V, each battery was charged at a constant voltage of 4.2 V until the current value reached (1/50) It=56 mA. The charging capacity at this time was determined as a normal-temperature charging capacity. Then, the battery was discharged at a constant current of 0.5 It=1400 mA until the battery voltage reached 2.75 V. The discharging capacity at this time was determined as an initial capacity.

Measurement of Cycle Characteristic

Each battery of Examples and Comparative Examples was charged in a constant temperature bath at 23° C. at a constant current of 1 It=2800 mA until the battery voltage reached 4.2 V. After the battery voltage reached 4.2 V, each battery was charged at a constant voltage of 4.2 V until the current value reached (1/50) It=56 mA. The battery was discharged at a constant current of 1 It=2800 mA until the battery voltage reached 2.75 V. The discharging capacity at this time was determined as a discharging capacity at the first cycle. This charging and discharging cycle was repeated 300 times. The discharging capacity at the 300th cycle was determined as a discharging capacity at the 300th cycle, and the cycle characteristic (%) was calculated based on the following calculation formula.

Cycle characteristic (%)=(discharging capacity at the 300th cycle/discharging capacity at the first cycle)×100

Measurement of Nail Penetration Characteristics

Thirty batteries of each example and comparative example were charged in a constant temperature bath at 23° C. at a constant current of 1 It=2800 mA until the battery voltage reached 4.35 V. After the battery voltage reached 4.35 V, each battery was charged at a constant voltage of 4.35 V until the current value reached (1/50) It=56 mA. An iron nail having a diameter of 2.5 mm was penetrated at a speed of 10 mm/s through the central part of the electrode assembly in each battery in an overcharged state at 23° C. After nail penetration, the batteries were left for 30 minutes, and the number of smoked or burned batteries was counted. Then, the nail penetration characteristic (%) was calculated with the following formula.

Nail penetration characteristic (%)=(the number of smoked or burned batteries/30)×100

Examples 1 to 10, Comparative Examples 1 to 10

$LiCoO_2$ having an average particle diameter of 13.1 μm and a specific surface area of 0.25 m²/g, was used as a positive electrode active material in each nonaqueous secondary battery of the Examples 1 to 10 and the Comparative Examples 1 to 10. Hereinafter, the added amount of various fluorinated cyclic carbonate esters is shown as the ratio to the total mass of a nonaqueous electrolyte, and the added amount of various coupling agents is shown as the ratio to the mass of a positive electrode active material.

In Comparative Example 1, the nonaqueous electrolyte contained no fluorinated cyclic carbonate esters, and no coupling agent was added to the positive electrode mixture layer. In Comparative Examples 2 to 7, FEC as a fluorinated cyclic carbonate esters with a varied concentration of 0.10 to 10.0% by mass was added to the nonaqueous electrolyte, while no coupling agent was added to the positive electrode mixture layer.

In Comparative Examples 8 and 9, no fluorinated cyclic carbonate esters was added to the nonaqueous electrolyte, and aluminum bisethylacetoacetate monoacetylacetonate (Comparative Example 8) or methyltriethoxysilane (Comparative Example 9) was added as a coupling agent to the positive electrode mixture layer. In Comparative Example 10, 0.10% by mass of FEC was added as a fluorinated cyclic carbonate esters to the nonaqueous electrolyte, and 0.20% by mass of aluminum bisethylacetoacetate monoacetylacetonate was added as a coupling agent to the positive electrode mixture layer.

In Examples 1 to 3, 0.20% by mass of aluminum bisethylacetoacetate monoacetylacetonate was added as a coupling agent to the positive electrode mixture layer, and 5.00% by mass each of FEC (Example 1), cis-DFEC (Example 2) or trans-DFEC (Example 3) was added as a fluorinated cyclic carbonate esters to the nonaqueous electrolyte.

In Examples 4 to 10, 0.20% by mass of aluminum bisethylacetoacetate monoacetylacetonate was added as a coupling agent to the positive electrode mixture layer, and FEC as a fluorinated cyclic carbonate esters with a varied concentration of 0.30 to 40.0% by mass was added to the nonaqueous electrolyte. The measurement results of Examples 1 to 10 and Comparative Examples 1 to 10 are listed in Table 1. Table 1 shows the result of Example 1 in two lines for easy understanding.

The following facts were found based on the results listed in Table 1. The results of Comparative Examples 1 to 7, in which no coupling agent was added to the positive electrode mixture layer, show that the nail penetration characteristics were largely decreased when a fluorinated cyclic carbonate esters was added to the nonaqueous electrolyte compared with the case with no fluorinated cyclic carbonate esters added. However, the cycle characteristics tended to be slightly increased as the added amount of the fluorinated cyclic carbonate esters was increased, but the initial capacity did not largely change.

The measurement results of Comparative Examples 8 and 9, in which a coupling agent was added to the positive electrode mixture layer but no fluorinated cyclic carbonate esters was added to the nonaqueous electrolyte, show that the initial capacity, the cycle characteristics, and the nail penetration characteristics were almost the same as those of the battery of Comparative Example 1, in which no coupling agent and no fluorinated cyclic carbonate esters in the nonaqueous electrolyte were added.

TABLE 1

Positive electrode: $LiCoO_2$
Average particle diameter: 13.1 μm
Specific surface area: 0.25 m²/g

| | Fluorinated cyclic carbonate esters | | Coupling agent | | | | |
|---|---|---|---|---|---|---|---|
| | Name | Amount added (% by mass) | Name | Amount added (% by mass) | Initial capacity (mAh) | Cycle characteristics (%) | Nail penetration characteristics (%) |
| Comparative Example 1 | None | 0 | None | — | 2813 | 66 | 53 |
| Comparative Example 2 | FEC | 0.1 | None | — | 2800 | 67 | 97 |
| Comparative Example 3 | FEC | 0.3 | None | — | 2812 | 71 | 100 |
| Comparative Example 4 | FEC | 1 | None | — | 2803 | 77 | 90 |
| Comparative Example 5 | FEC | 3 | None | — | 2809 | 78 | 93 |
| Comparative Example 6 | FEC | 5 | None | — | 2809 | 77 | 100 |
| Comparative Example 7 | FEC | 10 | None | — | 2806 | 79 | 93 |
| Comparative Example 8 | None | — | Aluminum bisethylacetoacetate monoacetylacetonate | 0.2 | 2807 | 69 | 47 |
| Comparative Example 9 | None | — | Methyltriethoxysilane | 1 | 2806 | 67 | 53 |
| Example 1 | FEC | 5 | Aluminum bisethylacetoacetate monoacetylacetonate | 0.2 | 2812 | 93 | 0 |
| Example 2 | cis-DFEC | 5 | Aluminum bisethylacetoacetate monoacetylacetonate | 0.2 | 2807 | 94 | 0 |
| Example 3 | trans-DFEC | 5 | Aluminum bisethylacetoacetate monoacetylacetonate | 0.2 | 2813 | 94 | 0 |
| Comparative Example 10 | FEC | 0.1 | Aluminum bisethylacetoacetate monoacetylacetonate | 0.2 | 2809 | 71 | 83 |
| Example 4 | FEC | 0.3 | Aluminum bisethylacetoacetate monoacetylacetonate | 0.2 | 2810 | 85 | 7 |
| Example 5 | FEC | 1 | Aluminum bisethylacetoacetate monoacetylacetonate | 0.2 | 2806 | 90 | 0 |
| Example 6 | FEC | 3 | Aluminum bisethylacetoacetate monoacetylacetonate | 0.2 | 2804 | 92 | 0 |
| Example 1 | FEC | 5 | Aluminum bisethylacetoacetate monoacetylacetonate | 0.2 | 2812 | 93 | 0 |
| Example 7 | FEC | 10 | Aluminum bisethylacetoacetate monoacetylacetonate | 0.2 | 2806 | 93 | 0 |
| Example 8 | FEC | 20 | Aluminum bisethylacetoacetate monoacetylacetonate | 0.2 | 2800 | 93 | 0 |
| Example 9 | FEC | 30 | Aluminum bisethylacetoacetate monoacetylacetonate | 0.2 | 2805 | 84 | 0 |
| Example 10 | FEC | 40 | Aluminum bisethylacetoacetate monoacetylacetonate | 0.2 | 2801 | 82 | 0 |

In contrast, in the case where 0.20% by mass of aluminum bisethylacetoacetate monoacetylacetonate was added as a coupling agent to the positive electrode mixture layer, when 5.00% by mass of various fluorinated cyclic carbonate esters was added to the nonaqueous electrolyte (Examples 1 to 3), both the cycle characteristics and the nail penetration characteristics were significantly better than those of Comparative Examples 1 to 9, while the initial capacity results were almost the same.

Based on the results of Comparative Example 10 and Examples 4 to 10, in the cases where 0.20% by mass of aluminum bisethylacetoacetate monoacetylacetonate was added as a coupling agent to the positive electrode mixture layer, when the added amount of a fluorinated cyclic carbonate esters in the nonaqueous electrolyte was less than 0.30% by mass with respect to the total mass of the nonaqueous electrolyte, both the cycle characteristics and the nail penetration characteristics largely decreased compared with those of Examples 4 to 10, while the initial capacity results were almost the same as those of Examples 4 to 10. Therefore, the added amount of a fluorinated cyclic carbonate esters is preferably 0.30% by mass or more in the nonaqueous electrolyte.

Based on the results of Comparative Example 10 and Examples 4 to 10, fine results were obtained even if the added amount of a fluorinated cyclic carbonate esters was large in the nonaqueous electrolyte. However, the cycle characteristics tend to decrease as the added amount increases, and thus, it is preferred that the added amount of a fluorinated cyclic carbonate esters do not exceed 40.0% by mass in the nonaqueous electrolyte.

Examples 11 to 28, Comparative Examples 11 and 12

In each nonaqueous secondary battery of Examples 11 to 28 and Comparative Examples 11 and 12, $LiCoO_2$ having an average particle diameter of 13.1 μm and a specific surface area of 0.25 $m^2$/g was used as a positive electrode active material, and FEC was added as a fluorinated cyclic carbonate esters to the nonaqueous electrolyte to have a concentration of 5.0% by mass.

In Comparative Example 11, ferric trisacetylacetonate was used as a coupling agent. In Examples 11 to 16, various compounds represented by General Formula (I) were used as a coupling agent, and in Examples 17 to 21, various silane coupling agents were used. Each of the coupling agents used in Examples 11 to 16 was a compound having an alkoxy group except for aluminum trisacetylacetonate used in Example 13 and zirconium tetrakisacetylacetonate used in Example 16. The names of the various coupling agents used in Examples 11 to 21 are listed in Table 2.

(I)

(where M is one atom selected from Al, Ti, and Zr, each of R1 and R2 is an alkyl group or an alkoxy group having 1 to 18 carbon atoms, and n represents an integer of 1 to 4.)

In Examples 22 to 28, and Comparative Example 12, aluminum bisethylacetoacetate monoacetylacetonate was added as a coupling agent with a varied concentration of 0.003 to 5.00% by mass (Examples 22 to 28) or with a concentration of 7.00% by mass (Comparative Example 12) to the positive electrode mixture. The results of Examples 11 to 28 and Comparative Examples 11, and 12 are listed in Table 2 together with the results of Example 1, and Comparative Example 6.

TABLE 2

Positive electrode: $LiCoO_2$
Average particle diameter: 13.1 μm
Specific surface area: 0.25 $m^2$/g
Fluorinated cyclic carbonate esters: FEC 5.0% by mass

| | Coupling agent | | | Cycle | Nail penetration |
|---|---|---|---|---|---|
| | Name | Amount added (% by mass) | Initial capacity (mAh) | characteristics (%) | characteristics (%) |
| Comparative Example 6 | None | | 2809 | 77 | 100 |
| Example 11 | Aluminum ethylacetoacetate diisopropylate | 0.20 | 2804 | 91 | 0 |
| Example 12 | Aluminum trisethylacetoacetate | 0.20 | 2808 | 94 | 0 |
| Example 1 | Aluminum bisethylacetoacetate monoacetylacetonate | 0.20 | 2812 | 93 | 0 |
| Example 13 | Aluminum trisacetylacetonate | 0.20 | 2806 | 87 | 0 |
| Example 14 | Titanium bis(ethylacetoacetate) diisopropoxide | 0.20 | 2801 | 85 | 3 |
| Example 15 | Titanium bisethylacetoacetate bisacetylacetonate | 0.20 | 2808 | 85 | 7 |
| Example 16 | Zirconium tetrakisacetylacetonate | 0.20 | 2808 | 84 | 0 |
| Comparative Example 11 | Ferric trisacetylacetonate | 0.20 | 2809 | 76 | 83 |
| Example 17 | Methyltrimethoxysilane | 1.00 | 2801 | 83 | 10 |
| Example 18 | Dimethyldimethoxysilane | 1.00 | 2802 | 82 | 13 |
| Example 19 | Methyltriethoxysilane | 1.00 | 2811 | 83 | 7 |
| Example 20 | Hexyltrimethoxysilane | 1.00 | 2805 | 81 | 7 |

TABLE 2-continued

Positive electrode: LiCoO$_2$
Average particle diameter: 13.1 μm
Specific surface area: 0.25 m$^2$/g
Fluorinated cyclic carbonate esters: FEC 5.0% by mass

| | Coupling agent | | | Cycle | Nail penetration |
|---|---|---|---|---|---|
| | Name | Amount added (% by mass) | Initial capacity (mAh) | characteristics (%) | characteristics (%) |
| Example 21 | 3-Acryloxypropyltrimethoxysilane | 1.00 | 2812 | 84 | 0 |
| Example 22 | Aluminum bisethylacetoacetate monoacetylacetonate | 0.003 | 2802 | 82 | 7 |
| Example 23 | Aluminum bisethylacetoacetate monoacetylacetonate | 0.01 | 2812 | 89 | 13 |
| Example 24 | Aluminum bisethylacetoacetate monoacetylacetonate | 0.10 | 2811 | 93 | 0 |
| Example 25 | Aluminum bisethylacetoacetate monoacetylacetonate | 0.50 | 2804 | 93 | 0 |
| Example 26 | Aluminum bisethylacetoacetate monoacetylacetonate | 1.00 | 2807 | 91 | 0 |
| Example 27 | Aluminum bisethylacetoacetate monoacetylacetonate | 2.00 | 2805 | 88 | 0 |
| Example 28 | Aluminum bisethylacetoacetate monoacetylacetonate | 5.00 | 2807 | 81 | 0 |
| Comparative Example 12 | Aluminum bisethylacetoacetate monoacetylacetonate | 7.00 | 2789 | 80 | 0 |

The following facts were found based on the results listed in Table 2. When FEC was added to the nonaqueous electrolyte, the results of Examples 1, and 11 to 16, in which a compound represented by General Formula (I) was used as a coupling agent, and the results of Examples 17 to 21, in which a silane coupling agent was used, were significantly better in terms of the cycle characteristics and the nail penetration characteristics than the results of Comparative Example 11, in which ferric trisacetylacetonate was used as a coupling agent, while the initial capacity results were almost the same. This reveals that a compound represented by General Formula (I) or a silane coupling agent is preferred as a coupling agent.

Among and Examples 1, and 11 to 16, in which a compound represented by General Formula (I) was used as a coupling agent, the results of Examples 1, and 11 to 13, in which M was Al, were better in terms of the cycle characteristics and the nail penetration characteristics than the results of Examples 14, and 15, in which M was Ti, while the initial capacity results were almost the same, and were better in terms of the cycle characteristics than the results of Example 16, in which M was Zr, while the initial capacity and nail penetration characteristics results were almost the same. This reveals that M is preferably Al when a compound represented by General Formula (I) is used as a coupling agent.

In Examples 1, and 11 to 13, in which M was Al, it is revealed that the results of Examples 1, 11, and 12 in which R1 or R2 was an alkoxy group, show slightly better cycle characteristics than those of Example 13, in which neither R1 nor R2 was an alkoxy group.

Based on the results of Examples 1, and 22 to 28 and Comparative Example 12, in which the amount of aluminum bisethylacetoacetate monoacetylacetonate as a coupling agent was varied from 0.003 to 7.00% by mass, when the added amount of the coupling agent was 0.003% by mass, sufficiently good result was obtained in terms of both the cycle characteristics and the nail penetration characteristics in comparison with the case with no coupling agent added (Comparative Example 6). However, when the added amount of the coupling agent was increased to 7.00% by mass (Comparative Example 12), the initial capacity decreased. This reveals that the added amount of a compound represented by General Formula (I) or a silane coupling agent as a coupling agent is preferably 0.003% by mass or more and 5% by mass or less with respect to the mass of a positive electrode active material when FEC or other fluorinated cyclic carbonate esters was added to the nonaqueous electrolyte.

Examples 29 to 42, And Comparative Examples 13 to 31

In each nonaqueous secondary battery of Examples 29 to 42 and Comparative Examples 13 to 31, FEC was added as a fluorinated cyclic carbonate esters to the nonaqueous electrolyte, and aluminum bisethylacetoacetate monoacetylacetonate was added to the positive electrode mixture layer as a coupling agent.

In Examples 29 to 37 and Comparative Examples 13 to 26, LiCoO$_2$ having a varied average particle diameter of 3.3 to 16.4 μm and a varied specific surface area of 0.11 to 0.90 m$^2$/g was used as the positive electrode active material, and FEC and a coupling agent were or were not added. In Examples 38 to 42 and Comparative Examples 27 to 31, various positive electrode active materials other than LiCoO$_2$ were used, and FEC and a coupling agent were or were not added.

In Examples 29 to 42, and Comparative Examples 13 to 31, when FEC was added to the nonaqueous electrolyte, FEC was added so as to have a concentration of 5.00% by mass, and when a coupling agent was added, the coupling agent was added so as to have a concentration of 0.20% by mass. The measurement results of Examples 29 to 42 and Comparative Examples 13 to 31 are listed in Table 3 together with those of Example 1 and Comparative Examples 1, and 6.

TABLE 3

Coupling agent: Aluminum bisethylacetoacetate monoacetylacetonate

| | | Physical properties of positive electrode | | | | | | |
|---|---|---|---|---|---|---|---|---|
| | Type of positive electrode active material | Average particle diameter (μm) | Specific surface area (m$^2$/g) | FEC (% by mass) | Coupling agent (% by mass) | Initial capacity (mAh) | Cycle characteristics (%) | Nail penetration characteristics (%) |
| Comparative Example 13 | LiCoO$_2$ | 3.3 | 0.85 | 5.00 | 0.20 | 2812 | 68 | 100 |
| Comparative Example 14 | LiCoO$_2$ | 3.5 | 0.63 | — | — | 2808 | 62 | 47 |
| Comparative Example 15 | LiCoO$_2$ | 3.5 | 0.63 | 5.00 | — | 2810 | 65 | 87 |
| Comparative Example 16 | LiCoO$_2$ | 3.5 | 0.63 | 5.00 | 0.20 | 2804 | 77 | 100 |
| Example 29 | LiCoO$_2$ | 4.5 | 0.55 | 5.00 | 0.20 | 2810 | 83 | 7 |
| Example 30 | LiCoO$_2$ | 4.6 | 0.72 | 5.00 | 0.20 | 2805 | 84 | 3 |
| Comparative Example 17 | LiCoO$_2$ | 5.2 | 0.90 | — | — | 2811 | 58 | 60 |
| Comparative Example 18 | LiCoO$_2$ | 5.2 | 0.90 | 5.00 | — | 2801 | 67 | 100 |
| Comparative Example 19 | LiCoO$_2$ | 5.2 | 0.90 | 5.00 | 0.20 | 2804 | 73 | 100 |
| Example 31 | LiCoO$_2$ | 5.5 | 0.80 | 5.00 | 0.20 | 2809 | 85 | 0 |
| Example 32 | LiCoO$_2$ | 5.7 | 0.67 | 5.00 | 0.20 | 2811 | 90 | 0 |
| Example 33 | LiCoO$_2$ | 6.1 | 0.49 | 5.00 | 0.20 | 2804 | 91 | 0 |
| Example 34 | LiCoO$_2$ | 9.7 | 0.38 | 5.00 | 0.20 | 2804 | 93 | 0 |
| Comparative Example 20 | LiCoO$_2$ | 14.3 | 0.11 | — | — | 2807 | 63 | 40 |
| Comparative Example 21 | LiCoO$_2$ | 14.3 | 0.11 | 5.00 | — | 2805 | 66 | 90 |
| Comparative Example 22 | LiCoO$_2$ | 14.3 | 0.11 | 5.00 | 0.20 | 2805 | 58 | 0 |
| Comparative Example 1 | LiCoO$_2$ | 13.1 | 0.25 | — | — | 2813 | 66 | 53 |
| Comparative Example 6 | LiCoO$_2$ | 13.1 | 0.25 | 5.00 | — | 2809 | 77 | 100 |
| Example 1 | LiCoO$_2$ | 13.1 | 0.25 | 5.00 | 0.20 | 2812 | 93 | 0 |
| Example 35 | LiCoO$_2$ | 14.6 | 0.22 | 5.00 | 0.20 | 2808 | 93 | 0 |
| Example 36 | LiCoO$_2$ | 15.2 | 0.18 | 5.00 | 0.20 | 2803 | 87 | 0 |
| Example 37 | LiCoO$_2$ | 15.5 | 0.13 | 5.00 | 0.20 | 2802 | 84 | 0 |
| Comparative Example 23 | LiCoO$_2$ | 16.4 | 0.16 | — | — | 2810 | 67 | 50 |
| Comparative Example 24 | LiCoO$_2$ | 16.4 | 0.16 | 5.00 | — | 2808 | 66 | 97 |
| Comparative Example 25 | LiCoO$_2$ | 16.4 | 0.16 | 5.00 | 0.20 | 2812 | 64 | 0 |
| Comparative Example 26 | LiCoO$_2$ | 16.6 | 0.12 | 5.00 | 0.20 | 2800 | 54 | 0 |
| Comparative Example 27 | LiMn$_{1/3}$Ni$_{1/3}$Co$_{1/3}$O$_2$ | 10.3 | 0.49 | — | — | 2812 | 69 | 30 |
| Example 38 | LiMn$_{1/3}$Ni$_{1/3}$Co$_{1/3}$O$_2$ | 10.3 | 0.49 | 5.00 | 0.20 | 2803 | 84 | 0 |
| Comparative Example 28 | LiMn$_2$O$_4$ | 12.7 | 0.58 | — | — | 2803 | 78 | 23 |
| Example 39 | LiMn$_2$O$_4$ | 12.7 | 0.58 | 5.00 | 0.20 | 2803 | 90 | 0 |
| Comparative Example 29 | LiNiO$_2$ | 10.8 | 0.32 | — | — | 2812 | 75 | 100 |
| Example 40 | LiNiO$_2$ | 10.8 | 0.32 | 5.00 | 0.20 | 2806 | 82 | 20 |
| Comparative Example 30 | LiNi$_{0.85}$Co$_{0.15}$O$_2$ | 10.2 | 0.31 | — | — | 2806 | 77 | 100 |
| Example 41 | LiNi$_{0.85}$Co$_{0.15}$O$_2$ | 10.2 | 0.31 | 5.00 | 0.20 | 2804 | 85 | 13 |
| Comparative Example 31 | LiCo$_{0.99}$Al$_{0.01}$O$_2$ | 9.3 | 0.44 | — | — | 2803 | 79 | 50 |
| Example 42 | LiCo$_{0.99}$Al$_{0.01}$O$_2$ | 9.3 | 0.44 | 5.00 | 0.20 | 2801 | 92 | 0 |

The following facts were found based on the results listed in Table 3. In Comparative Example 13, in which LiCoO$_2$ having an average particle diameter of 3.3 μm and a specific surface area of 0.85 m$^2$/g, was used as the positive electrode active material, FEC and a coupling agent were added, but both the cycle characteristics and the nail penetration characteristics largely decreased. However, the initial capacity was good in Comparative Example 13.

In Comparative Examples 14 to 16, in which LiCoO$_2$ having an average particle diameter of 3.5 μm and a specific surface area of 0.63 m$^2$/g, was used as the positive electrode active material, when only FEC was added (Comparative Example 15) and both FEC and a coupling agent were added (Comparative Example 16), the initial capacity was almost the same, but both the cycle characteristics and the nail penetration characteristics largely decreased compared with the case in which neither FEC nor a coupling agent was added (Comparative Example 14). In Comparative Examples 17 to 19, in which LiCoO$_2$ having an average particle diameter of 5.2 μm and a specific surface area of 0.90 m$^2$/g was used as the positive electrode active material, when only FEC was added (Comparative Example 18) and both FEC and a coupling agent were added (Comparative Example 19), the initial capacity was almost the same, but both the cycle characteristics and the nail penetration characteristics significantly decreased compared with the case in which neither FEC nor a coupling agent was added (Comparative Example 17).

In Comparative Examples 20 to 22, in which LiCoO$_2$ having an average particle diameter of 14.3 μm and a specific surface area of 0.11 m$^2$/g was used as the positive electrode active material, when only FEC was added (Comparative Example 21), the initial capacity was almost the same, and the cycle characteristics were slightly better, but the nail penetration characteristics were largely decreased compared with the case in which neither FEC nor a coupling agent was added (Comparative Example 20). When both FEC and a coupling agent were added (Comparative Example 22), the initial capacity was almost the same, and the nail penetration characteristics were significantly better, but the cycle characteristics decreased compared with the case in which neither FEC nor a coupling agent was added (Comparative Example 20).

In Comparative Examples 23 to 25, in which LiCoO$_2$ having an average particle diameter of 16.4 μm and a specific surface area of 0.16 m$^2$/g was used as the positive electrode active material, when only FEC was added (Comparative Example 24), both the initial capacity and the cycle characteristics were almost the same, but the nail penetration characteristics largely decreased compared with the case in which neither FEC nor a coupling agent was added (Comparative Example 23). When both FEC and a coupling agent were added (Comparative Example 25), the initial capacity was almost the same, and the nail penetration characteristics were significantly better, but the cycle characteristics decreased compared with the case in which neither FEC nor a coupling agent was added (Comparative Example 23). Furthermore, when LiCoO$_2$ having an average particle diameter of 16.6 μm and a specific surface area of 0.12 m$^2$/g was used as the positive electrode active material and both FEC and a coupling agent were added (Comparative Example 26), the initial capacity was almost the same, and the nail penetration characteristics were significantly better, but the cycle characteristics decreased compared with those of the Comparative Example 23.

In contrast, in Examples 1, and 29 to 37, in which LiCoO$_2$ having an average particle diameter of 4.5 μm to 15.5 μm and a specific surface area of 0.13 to 0.80 m$^2$/g was used as the positive electrode active material and both FEC and a coupling agent were added, superior effects were obtained as follows: the initial capacities were 2800 mAh or more; the cycle characteristics were 83% or more; and the nail penetration characteristics were 7% or less.

The following facts were found by comparing the results of Comparative Examples 13, 16, 19, 22, 25, and 26, in which both FEC and a coupling agent were added, with the results of Examples 1, and 29 to 37 in the cases where the positive electrode active material was LiCoO$_2$. When the positive electrode active material had an average particle diameter of less than 4.5 μm, even if the specific surface area was within a range of 0.13 to 0.80 m$^2$/g, the cycle characteristics decreased and the nail penetration characteristics significantly decreased, while the initial capacity results were almost the same. Furthermore, when the positive electrode active material had an average particle diameter of more than 15.5 μm, even if the specific surface area was within a range of 0.13 to 0.80 m$^2$/g, the cycle characteristics decreased, while the initial capacity and the nail penetration characteristics results were almost the same.

When the positive electrode active material had a specific surface area of less than 0.13 m$^2$/g, the cycle characteristics decreased, while the initial capacity and the nail penetration characteristics results were almost the same even if the positive electrode active material had an average particle diameter of 4.5 to 15.5 μm. Furthermore, when the positive electrode active material had a specific surface area of more than 0.80 m$^2$/g, the cycle characteristics decreased and the nail penetration characteristics significantly decreased, while the initial capacity results were almost the same even if the positive electrode active material had an average particle diameter of 4.5 to 15.5 μm.

Accordingly, in the nonaqueous secondary batteries of the invention, it is clear that both of FEC or other fluorinated cyclic carbonate esters and a coupling agent are preferably contained and the positive electrode active material preferably has an average particle diameter of 4.5 to 15.5 μm and a specific surface area of 0.13 to 0.80 m$^2$/g.

The measurement results of Examples 38 to 42, and Comparative Examples 27 to 31 will now be discussed. In Examples 38 to 42, and Comparative Examples 27 to 31, Li$_{1/3}$Ni$_{1/3}$Co$_{1/3}$O$_2$, LiMn$_2$O$_4$, LiNiO$_2$, LiNi$_{0.85}$Co$_{0.15}$O$_2$, or LiCo$_{0.99}$Al$_{0.01}$O$_2$ was used as a positive electrode active material, and neither FEC nor a coupling agent was contained (Comparative Examples 27 to 31), or both FEC and a coupling agent were contained (Examples 38 to 42). In Examples 38 to 42, and Comparative Examples 27 to 31, the average particle diameter of the positive electrode active material was within a range of 4.5 to 15.5 μm and the specific surface area was within a range of 0.13 to 0.80 m$^2$/g.

Based on the results listed in Table 3, with any of Li$_{1/3}$Ni$_{1/3}$Co$_{1/3}$O$_2$, LiMn$_2$O$_4$, LiNiO$_2$, LiNi$_{0.85}$Co$_{0.15}$O$_2$, and LiCo$_{0.99}$Al$_{0.01}$O$_2$ used as a positive electrode active material, when both FEC and a coupling agent were contained (Examples 38 to 42), the cycle characteristics and the nail penetration characteristics were better than those in the case in which neither FEC nor a coupling agent was contained (Comparative Examples 27 to 31), while the initial capacities were slightly decreased. Therefore, it is clear that the results of the study on using LiCoO$_2$ as a positive electrode active material can be equally applied to positive electrode active materials made of a lithium composite oxide that are commonly used in nonaqueous secondary batteries.

What is claimed is:

1. A nonaqueous secondary battery comprising:
   a positive electrode plate formed with a positive electrode mixture layer having a lithium composite oxide as a positive electrode active material;
   a negative electrode plate;
   a separator; and
   a nonaqueous electrolyte,
   the positive electrode active material having an average particle diameter of 4.5 to 15.5 μm and a specific surface area of 0.13 to 0.80 m$^2$/g,
   the positive electrode mixture layer containing a silane coupling agent, a coupling agent represented by General Formula (I), or a silane coupling agent and a coupling agent represented by General Formula (I), at a content of 0.003% by mass or more and 5% by mass or less with respect to the mass of the positive electrode active material,

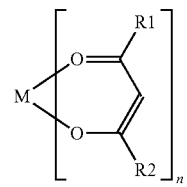
(I)

(where M is one atom selected from Al, Ti, and Zr, each of R1 and R2 is an alkyl group or an alkoxy group having 1 to 18 carbon atoms, and n represents an integer of 1 to 4), and
   the nonaqueous electrolyte containing a fluorinated cyclic carbonate ester represented by General Formula (II) at a content of 0.3% by mass or more with respect to the total mass of the nonaqueous electrolyte:

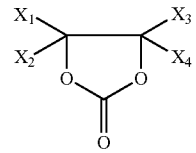
(II)

(where each of X1 to X4 is a fluorine group, an alkyl group, or a fluorinated alkyl group, X1 to X4 are optionally the same as or different from each other, at least one of which is a fluorine group or a fluorinated alkyl group).

2. The nonaqueous secondary battery according to claim 1, wherein the positive electrode mixture layer contains a coupling agent represented by General Formula (I), where M is Al:

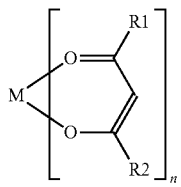

(where each of R1 and R2 is an alkyl group or an alkoxy group having 1 to 18 carbon atoms, and n represents an integer of 1 to 4).

3. The nonaqueous secondary battery according to claim 1, wherein the positive electrode mixture layer contains a coupling agent represented by General Formula (I), where at least one of R1 and R2 is an alkoxy group:

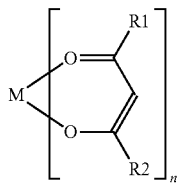

(where M is one atom selected from Al, Ti, and Zr, each of R1 and R2 is an alkyl group or an alkoxy group having 1 to 18 carbon atoms, and n represents an integer of 1 to 4).

4. The nonaqueous secondary battery according to claim 1, wherein the nonaqueous electrolyte contains the fluorinated cyclic carbonate ester represented by General Formula (II) at a content of 0.3% by mass or more and 40% by mass or less with respect to the total mass of the nonaqueous electrolyte.

5. The nonaqueous secondary battery according to claim 1, wherein the fluorinated cyclic carbonate ester is FEC, cis-DFEC or trans-DFEC.

6. The nonaqueous secondary battery according to claim 5 wherein the fluorinated cyclic carbonate ester is FEC.

7. The nonaqueous secondary battery according to claim 1, wherein the coupling agent represented by General Formula (I) is one selected from the group consisting of aluminum bisethylacetoacetate monoacetylacetonate, aluminum ethylacetoacetate diisopropylate, aluminum triethilacetate, aluminum trisacetylacetonate, titanium bis(ethylacetoacetate), titanium bisethylacetoacetate bisacetylacetonate and zirconium tetrakisacetylacetonate.

8. The nonaqueous secondary battery according to claim 4, wherein the coupling agent represented by General Formula (I) is aluminum bisethylacetoacetate monoacetylacetonate.

* * * * *